United States Patent
Ichikawa

(10) Patent No.: US 10,530,564 B2
(45) Date of Patent: Jan. 7, 2020

(54) COMMUNICATION SYSTEM, TRANSMISSION APPARATUS, RECEPTION APPARATUS, AND COMMUNICATION METHOD

(71) Applicant: LAPIS Semiconductor Co., Ltd., Yokohama (JP)

(72) Inventor: Tomoyuki Ichikawa, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 106 days.

(21) Appl. No.: 15/267,827

(22) Filed: Sep. 16, 2016

(65) Prior Publication Data
US 2017/0085409 A1 Mar. 23, 2017

(30) Foreign Application Priority Data
Sep. 18, 2015 (JP) .................................. 2015-185325

(51) Int. Cl.
| H04L 27/26 | (2006.01) |
| H04L 7/04 | (2006.01) |
| H04L 7/08 | (2006.01) |
| H04L 12/10 | (2006.01) |

(52) U.S. Cl.
CPC ............... *H04L 7/042* (2013.01); *H04L 7/08* (2013.01); *H04L 12/10* (2013.01); *H04L 27/261* (2013.01)

(58) Field of Classification Search
CPC .......................... H04L 27/2656; H04L 7/0054
See application file for complete search history.

(56) References Cited

U.S. PATENT DOCUMENTS

| 4,001,693 A | * | 1/1977 | Stackhouse | H04B 7/26 455/502 |
| 4,027,243 A | * | 5/1977 | Stackhouse | H04L 1/0078 375/365 |
| 4,849,994 A | * | 7/1989 | Heitmann | G11B 20/12 375/366 |

(Continued)

FOREIGN PATENT DOCUMENTS

| JP | H11-298432 A | 10/1999 |
| JP | 2001-060943 A | 3/2001 |

(Continued)

*Primary Examiner* — Zhiren Qin
(74) *Attorney, Agent, or Firm* — Rabin & Berdo, P.C.

(57) ABSTRACT

A transmission apparatus includes: a data frame sequence generation part that generates a data frame sequence; a synchronization frame generation part that generates a synchronization frame constituted by n synchronization words each being either a first synchronization word or an inverted one of the first synchronization word; a communication frame generation part that generates a communication frame by adding the synchronization frame to a top portion of the data frame sequence; and a transmission part that transmits the communication frame. A reception apparatus includes: a reception part that receives the communication frame as a reception frame; a first synchronization detection part that performs first synchronization detection by detecting an arrangement pattern of the synchronization words in the synchronization frame of the reception frame; and a data reproduction part that reproduces data included in the reception frame according to the first synchronization detection.

9 Claims, 4 Drawing Sheets

(56) References Cited

U.S. PATENT DOCUMENTS

2009/0279654 A1* 11/2009 Konishi ................ H04L 7/0337
　　　　　　　　　　　　　　　　　　　　　　375/362
2014/0112415 A1*  4/2014 Chiba .................... H04L 27/14
　　　　　　　　　　　　　　　　　　　　　　375/316

FOREIGN PATENT DOCUMENTS

| JP | 2010-114921 A | 5/2010 |
| JP | 2010-200122 A | 9/2010 |
| JP | 2010283768 A | 12/2010 |

* cited by examiner

COMMUNICATION SYSTEM, TRANSMISSION APPARATUS, RECEPTION APPARATUS, AND COMMUNICATION METHOD

BACKGROUND OF THE INVENTION

1. Field of the Invention

The present invention relates to a communication system, a transmission apparatus, a reception apparatus, and a communication method.

2. Description of the Related Art

In communication systems for wired communication, wireless communication, and the like, information data is transmitted and received in the form of communication frames. For example, a communication frame includes a synchronization word, control information, and a payload (for example, Japanese Patent Application Laid-Open No. 2010-200122). In communications using such a communication frame, a reception-side communication apparatus detects the synchronization word and synchronizes a transmission-side communication apparatus and the reception-side communication apparatus while the communication frame is transmitted and received (for example, Japanese Patent Application Laid-Open No. 2010-114921).

SUMMARY OF THE INVENTION

In the communication frame having the foregoing configuration, the payload portion may include a bit string that coincides with the synchronization word. In such a case, the detection of the synchronization word in the reception-side apparatus can be erroneous and cause erroneous synchronization. If erroneous synchronization occurs, the communication state becomes unstable due to occurrence of unnecessary communication. The occurrence of unnecessary communication from erroneous synchronization also has had the problem of useless power consumption.

To avoid such erroneous synchronization, synchronization detection may be periodically performed by utilizing the periodic reception of the synchronization word in each frame. However, such a method needs to receive a large number of frames for stable synchronization. There has thus been a problem of taking a long time to establish synchronization.

The longer the synchronization word, the less likely the same bit string as that of the synchronization word is to occur in the payload. A long synchronization word can thus be used to avoid erroneous synchronization. However, as the synchronization word increases in length, the ratio of the payload in the communication frame decreases accordingly. There has thus been a problem of a decrease in the transmission efficiency of the information data.

To solve the foregoing problems, an object of the present invention is to provide a communication system, a transmission apparatus, a reception apparatus, and a communication method which can suppress the occurrence of erroneous synchronization while maintaining the transmission efficiency.

A communication system according to the present invention includes: a transmission apparatus including a data frame sequence generation part for generating a data frame sequence including a series of data frames carrying information data in a divided manner; a synchronization frame generation part for generating a synchronization frame constituted by n (n: an integer greater than or equal to two) synchronization words each being either a first synchronization word or an inverted one of the first synchronization word, a communication frame generation part for generating a communication frame by adding the synchronization frame to a top portion of the data frame sequence, and a transmission part for transmitting the communication frame via a network; and a reception apparatus including a reception part for receiving the communication frame via the network as a reception frame, a first synchronization detection part for performing first synchronization detection by detecting an arrangement pattern of the first synchronization word and/or the inverted one of the first synchronization word included in the synchronization frame of the reception frame, and a data reproduction part for reproducing data included in the data frames of the reception frame according to the first synchronization detection to obtain reception data.

A transmission apparatus according to the present invention includes: a data frame sequence generation part for generating a data frame sequence including a series of data frames carrying information data in a divided manner; a synchronization frame generation part for generating a synchronization frame constituted by n (n: an integer greater than or equal to two) synchronization words each being either a first synchronization word or an inverted one of the first synchronization word; a communication frame generation part for generating a communication frame by adding the synchronization frame to a top portion of the data frame sequence; and a transmission part for transmitting the communication frame via a network.

A reception apparatus according to the present invention includes: a reception part for receiving a communication frame via a network as a reception frame; a first synchronization detection part for performing first synchronization detection by detecting an arrangement pattern constituted by n (n: an integer greater than or equal to two) synchronization words each being either a first synchronization word or an inverted one of the first synchronization word from a synchronization frame of the reception frame; and data reproduction part for reproducing data included in a data frame of the reception frame according to the first synchronization detection to obtain reception data.

A communication method according to the present invention is a communication method for transmitting and receiving a communication frame between a transmission apparatus and a reception apparatus via a network, the communication method including: a data frame sequence generation step of causing the transmission apparatus to generate a data frame sequence including a series of data frames carrying information data in a divided manner; a synchronization frame generation step of causing the transmission apparatus to generate a synchronization frame constituted by n (n: an integer greater than or equal to two) synchronization words each being either a first synchronization word or an inverted one of the first synchronization word; a communication frame generation step of causing the transmission apparatus to generate a communication frame by adding the synchronization frame to a top portion of the data frame sequence; a transmission step of causing the transmission apparatus to transmit the communication frame via the network; a reception step of causing the reception apparatus to receive the communication frame via the network as a reception frame; a first synchronization detection step of causing the reception apparatus to perform first synchronization detection by detecting an arrangement pattern of the first synchronization word and/or the inverted one of the synchronization word included in the synchronization frame of the reception frame; and a data reproduction step of causing the reception apparatus to reproduce data included in the data frames of the reception frame according to the first synchronization detection to obtain reception data.

According to the present invention, the occurrence of erroneous synchronization can be suppressed while maintaining the transmission efficiency.

BRIEF DESCRIPTION OF THE DRAWINGS

Features of the present invention will be described in the following description with reference to the accompanying drawings, in which.

DETAILED DESCRIPTION OF THE INVENTION

An embodiment of the present invention will be described in detail below with reference to the drawings.

Embodiment 1

Figure 1:
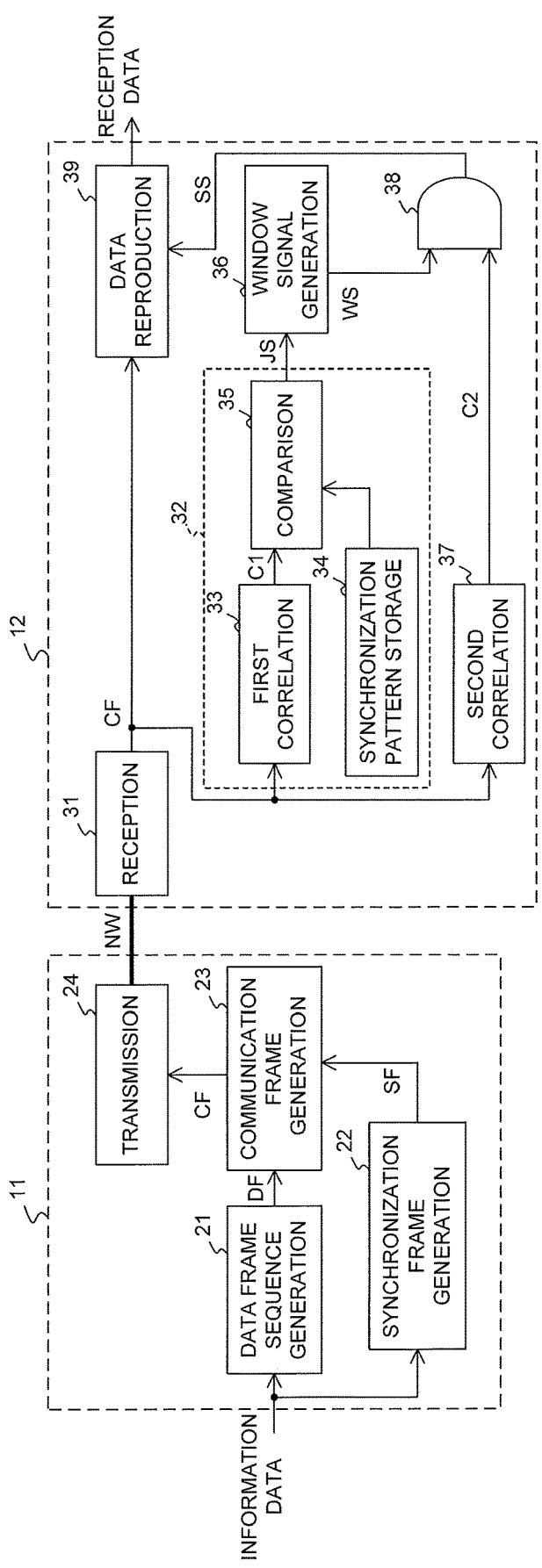
FIG. 1 is a block diagram illustrating a configuration of a communication system 10 according to the present invention.

FIG. 1 is a block diagram illustrating a configuration of a communication system 10 according to the present invention. The communication system 10 includes a transmission apparatus 11 which is a transmission-side communication apparatus, and a reception apparatus 12 which is a reception-side communication apparatus connected to the transmission apparatus 11 via a network NW. The transmission apparatus 11 and the reception apparatus 12 transmit and receive communication frames via the network NW.

Figure 2:
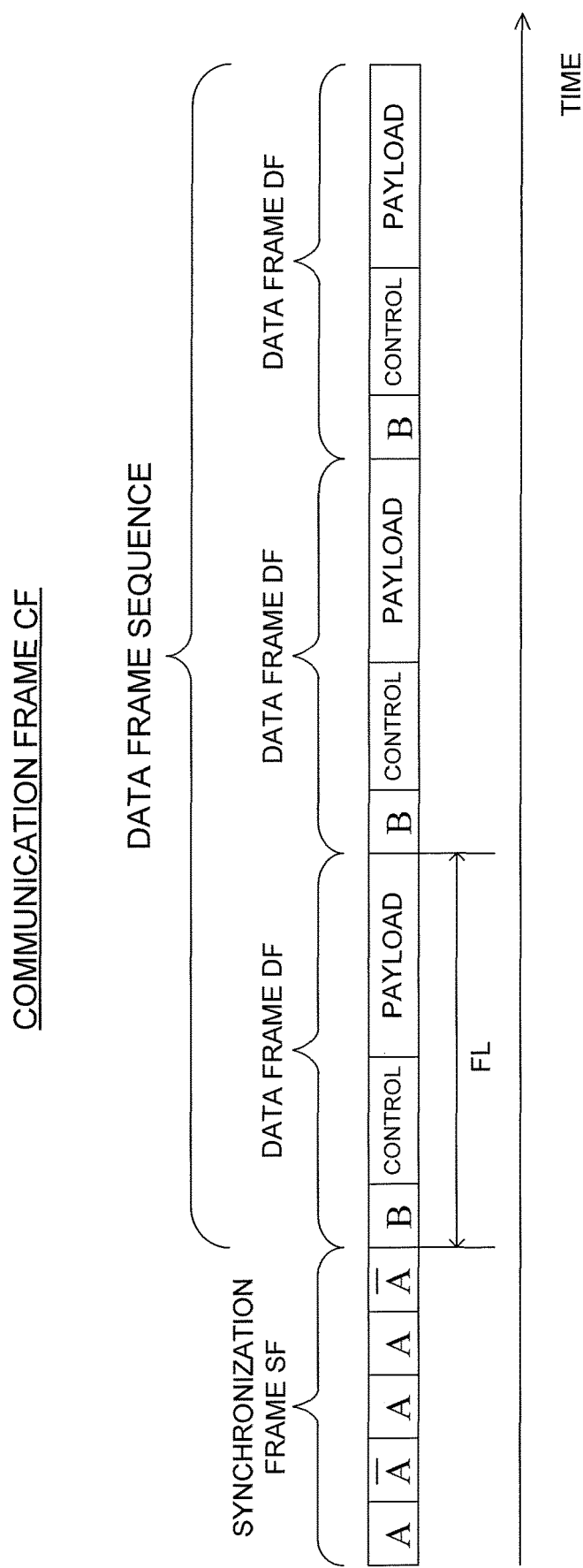
FIG. 2 is a diagram illustrating a configuration of a communication frame according to the present invention.

FIG. 2 is a diagram illustrating a configuration of a communication frame CF to be transmitted and received in the communication system 10 according to the present invention. The communication frame CF includes a synchronization frame SF and a data frame sequence including a series of data frames DF.

The synchronization frame SF includes a permutation of synchronization words, constituted by arranging as many a synchronization word A (first synchronization word) and/or an inverted synchronization word (in FIG. 2, denoted by an overlined "A") as five words with repetition. The synchronization word A includes a predetermined word bit string. The inverted synchronization word includes a word bit string obtained by inverting the synchronization word A. FIG. 2 illustrates an example in which the synchronization frame SF includes a permutation "the synchronization word A, the inverted synchronization word, the synchronization word A, the synchronization word A, and the inverted synchronization word."

A data frame DF has a frame length FL, and includes a synchronization word B (second synchronization word), control information, and a payload. The control information includes a destination, path, and the like of transmission and reception of the communication frame. The payload is the main body of information data. If the synchronization frame SF is followed by a plurality of consecutive data frames DF, synchronization needs to be maintained. The synchronization word B is thus inserted into the top portion of each data frame DF so that the reception apparatus 12 periodically detects synchronization. The control information is inserted between the synchronization word B and the payload of each data frame DF. In other words, in the data frame sequence, the synchronization word B and the control information are inserted at every predetermined data length of the information data (data length of the payload).

Referring to FIG. 1 again, the transmission apparatus 11 includes a data frame sequence generation part 21, a synchronization frame generation part 22, a communication frame generation part 23, and a transmission part 24.

The data frame sequence generation part 21 generates a data frame sequence including a series of data frames DF by framing information data. The data frame sequence generation part 21 divides the information data into transmission data pieces having a predetermined data length to generate payloads. The data frame sequence generation part 21 inserts the synchronization word B at every predetermined length of data (predetermined data length of data), and makes the synchronization word B and the predetermined length of data into one data frame DF. The data frames DF thus carry the information data in a divided manner. The data frame sequence generation part 21 also inserts the control information into between the synchronization word B and the payload. If the information data has a large data length, a data frame sequence including a plurality of series of data frames DF is generated.

The synchronization frame generation part 22 generates a synchronization frame SF. For example, the synchronization frame generation part 22 includes a memory (not illustrated) which stores a synchronization pattern (arrangement pattern including a permutation of synchronization words A and/or inverted synchronization words with repetition). The synchronization pattern is determined in advance according to the destination of transmission of the communication frame, such as a terminal (the reception apparatus 12 or the like). The synchronization frame generation part 22 generates the synchronization frame SF by arranging the synchronization word A and the inverted synchronization word according to the synchronization pattern. For example, the synchronization frame generation part 22 generates a synchronization frame SF including an arrangement pattern "the synchronization word A, the inverted synchronization word, the synchronization word A, the synchronization word A, and the inverted synchronization word" illustrated in FIG. 2.

Referring to FIG. 1 again, the communication frame generation part 23 generates a communication frame CF by adding the synchronization frame SF to the top portion of the data frame sequence (the top portion of the first data frame DF in the series of data frames DF).

The transmission part 24 transmits the communication frame CF to the reception apparatus 12 via the network NW.

The reception apparatus 12 includes a reception part 31, a first synchronization detection part 32, a window signal generation part 36, a second correlator 37, an AND gate 38, and a data reproduction part 39. The first synchronization detection part 32 includes a first correlator 33, a synchronization pattern storage part 34, and a comparison part 35.

The reception part 31 receives the communication frame CF via the network NW (hereinafter, the received communication frame CF may be referred to as a reception frame).

The first synchronization detection part 32 performs first synchronization detection by detecting the arrangement pattern (synchronization pattern) of the synchronization word A and the inverted synchronization word included in the synchronization frame SF of the reception frame.

In the first synchronization detection, the first correlator 33 detects the synchronization word A and the inverted synchronization word included in the synchronization frame SF of the reception frame. The first correlator 33 generates a first correlation output C1 indicating coincidence or non-coincidence with the synchronization word A and the inverted synchronization word.

Figure 3:
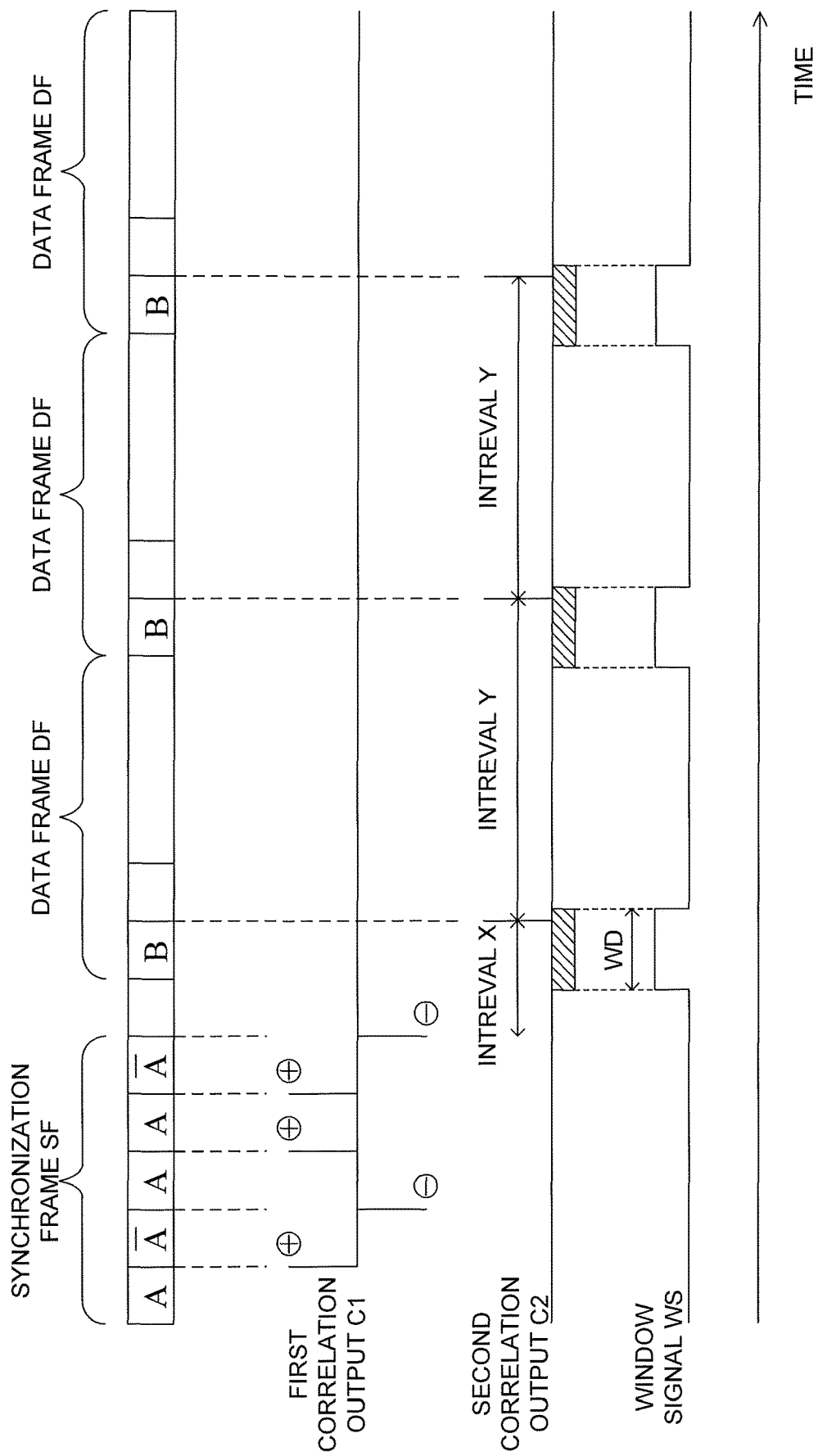
FIG. 3 is a diagram schematically illustrating synchronization detection in the communication system according to the present invention.

FIG. 3 is a diagram schematically illustrating an example of correlation outputs in the reception apparatus 12. The first correlator 33 generates a first correlation output C1 which includes a correlation output of "+" (positive polarity) if the word bit string included in the synchronization frame SF coincides with the synchronization word A, and "−" (negative polarity) if the word bit string coincides with the inverted synchronization word. For example, if the synchronization frame SF includes a permutation "the synchronization word A, the inverted synchronization word, the synchronization word A, the synchronization word A, and the inverted synchronization word," the first correlation output C1 is "+−++−."

Referring to FIG. 1 again, the synchronization pattern storage part 34 stores an arrangement pattern of synchronization words including a predetermined permutation of "+"s and "−"s with repetition (for example, "+−++−").

The comparison part 35 compares the first correlation output C1 output from the first correlator 33 with the synchronization pattern stored in the synchronization pattern storage part 34 to determine whether the first correlation output C1 coincides with the synchronization pattern. The comparison part 35 supplies a judgment signal JS to the window signal output part 36. The judgment signal JS is a binary signal that indicates, for example, a high level if the first correlation output C1 coincides with the synchronization pattern, and a low level if not.

The window signal output part 36 outputs a window signal SW such as illustrated in FIG. 3 if a judgment signal JS indicating "coincidence" is supplied from the comparison part 35. The window signal WS is a signal that becomes a high level during periods (window width WD) shown by oblique lines in the diagram, and a low level in the other periods. The window width WD is smaller than the frame length FL. The periods in which the window signal WS becomes a high level are determined in advance to include the positions where there is the synchronization word B in the communication frame CF, on the basis of the length (interval X) from the end of the synchronization frame SF to the end of the synchronization word B in the first data frame DF and the length (interval Y) from the end of the synchronization word B in a data frame DF to the end of the synchronization word B in the next data frame DF.

Referring to FIG. 1 again, the second correlator 37 generates a second correlation output C2 on the basis of whether the word bit string in the communication frame CF coincides with the synchronization word B.

The AND gate 38 outputs a signal including an AND between the window signal WS supplied from the window signal output part 36 and the second correlation output C2 supplied from the second correlator 37 as a synchronization signal SS. The AND gate 38 thus outputs the synchronization signal SS of high level only if a word bit string coincident with the synchronization word B is detected in a period in which the window signal WS is at the high level.

By such an operation of the window signal output part 36 and the AND gate 38, the result of synchronization detection (second synchronization detection) by the second correlator 37 is reflected on the synchronization signal SS only in the periods in which the window signal WS is at the high level as illustrated in FIG. 3. The detection of the synchronization word B is thus substantially performed only during the periods in which the window signal WS is at the high level as illustrated in FIG. 3. In other words, the second correlator 37 serving as a second synchronization detection part performs the second synchronization detection by detecting the synchronization words B included in the data frames DF in synchronization detection intervals that include the top portions of the data frames DF in the communication frame CF, or reception frame, and are shorter than the flame length FL.

Referring to FIG. 1 again, the data reproduction part 39 reproduces data from the communication frame CF according to the synchronization signal SS to obtain reception data. More specifically, the data reproduction part 39 obtains the reception data by reproducing the data included in the data frames DF of the reception frame according to the first synchronization detection and the second synchronization detection.

As described above, in the communication system 10 according to the present invention, the reception apparatus 12 performs synchronization detection based on the arrangement pattern (periodicity and the order of occurrence of positive and negative polarities) of the synchronization word A and the inverted synchronization word included in the synchronization frame SF. According to such a configuration, erroneous synchronization can be prevented from occurring due to accidental inclusion of the word bit string constituting the synchronization frame SF in a data frame DF. More specifically, even if the payload of a data frame DF includes the same word bit string as that of the synchronization word A, the possibility for the word bit string to have the same periodicity and the same order of occurrence of positive and negative polarities as in the synchronization frame SF is extremely low. The occurrence of erroneous synchronization can thus be suppressed.

The reception apparatus 12 according to the present invention performs the synchronization detection on the basis of the arrangement pattern (periodicity and the order of occurrence of positive and negative polarities) of the synchronization word A and the inverted synchronization word included in the synchronization frame SF. Since the synchronization word itself does not need to be made longer to avoid erroneous synchronization, the ratio of the payloads in the communication frame will not be suppressed. The occurrence of erroneous synchronization can thus be suppressed without a decrease in the transmission efficiency.

The result of the correlation output (second synchronization detection) of the second correlator 37 with respect to the synchronization word B is reflected on the synchronization signal SS only during the periods in which the window signal WS becomes a high level. As described above, the periods in which the window signal WS becomes a high level include the top portions of the data frames DF and are shorter than the flame length FL. Since the payload portions can be excluded from the detection range of the second synchronization detection to limit the second synchronization detection to near the ranges where there is the synchronization word B, erroneous synchronization can be prevented from occurring due to the inclusion of the same word bit string as that of the synchronization word B in a payload portion. Even if the data frames DF have a large data length, stable synchronization can thus be maintained while suppressing the occurrence of erroneous synchronization.

Since the occurrence of erroneous synchronization can be suppressed and the range of synchronization detection in the data frames DF can be limited as described above, the operating power consumption of the reception apparatus 12 can be suppressed.

The synchronization word A and the inverted synchronization word can be detected by the same correlator. As compared to a case where the synchronization frame SF includes a permutation of different synchronization words, the circuit scale of the reception apparatus 12 can be suppressed.

The information about the order of arrangement of the synchronization word A and the inverted synchronization word (for example, "+−++−") can be transmitted as binary information (for example, "10110"). For example, in a communication environment where a plurality of reception apparatuses are connected to the network NW, the arrangement pattern of the synchronization word A and the inverted synchronization word can thus be used as activation identification information for activating a reception apparatus serving as a communication destination.

Figure 4:
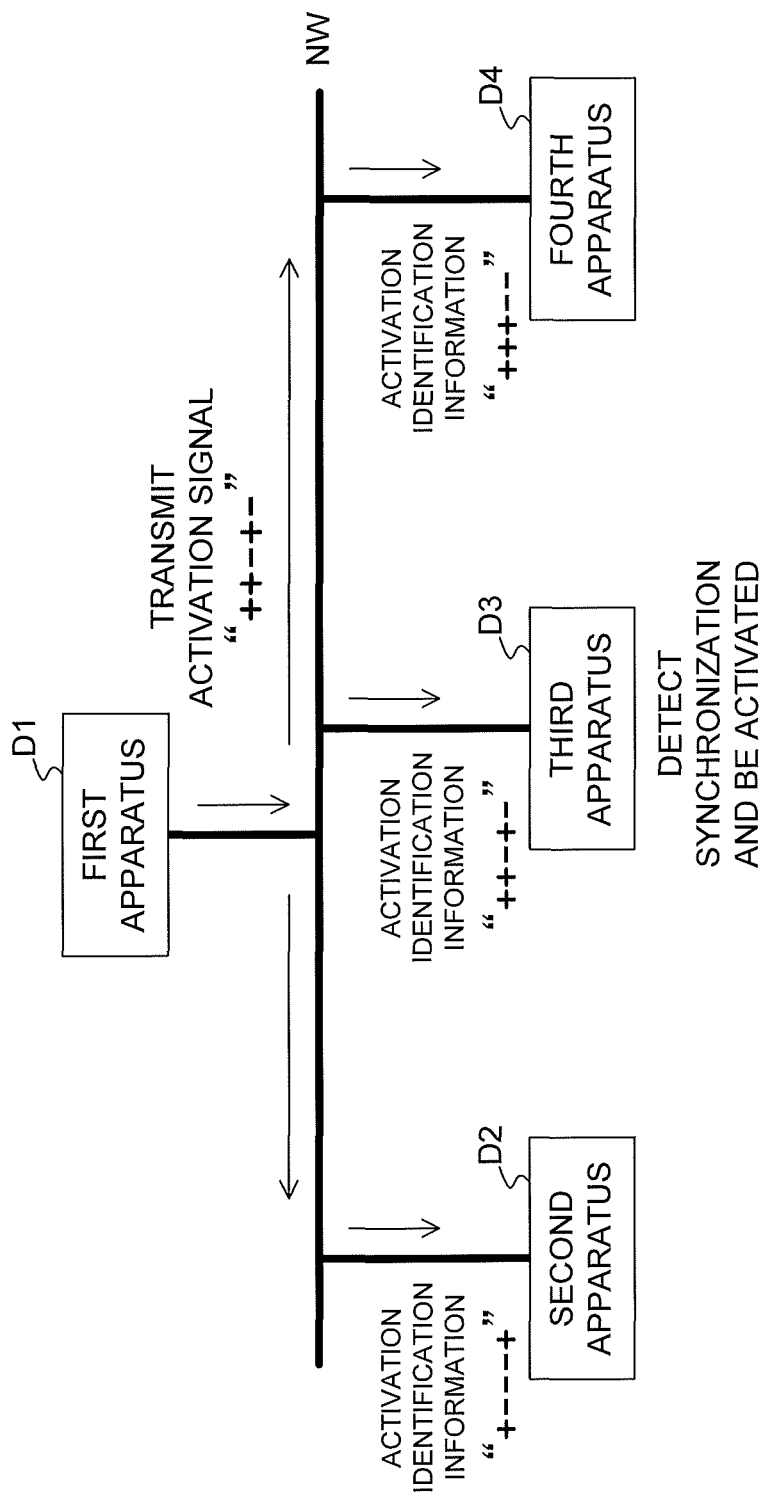
FIG. 4 is a diagram illustrating an example of an activation system using a synchronization frame according to the present invention.

FIG. 4 is a diagram schematically illustrating an example of an activation system in such a communication environment. For example, a first apparatus D1 that is a transmission apparatus and second, third, and fourth apparatuses D2, D3, and D4 that are reception apparatuses are connected to the network NW. Respective different pieces of activation identification information are set in the second, third, and fourth apparatuses D2, D3, and D4. Like the synchronization frame SF, the activation identification information includes an arrangement pattern constituted by arranging as many a synchronization word A and/or an inverted synchronization word as five words with repetition. For example, the second apparatus D2 has activation identification information including an arrangement pattern "+−−−+," the third apparatus D3 "++−+−," and the fourth apparatus D4 "+++−−."

The first apparatus D1 transmits a synchronization frame SF including an arrangement pattern "++−+−" as an activation signal to the second, third, and fourth apparatuses D2, D3, and D4 via the network NW. The second, third, and fourth apparatuses D2, D3, and D4 are activated if the arrangement pattern included in the received activation signal coincides with that of their own activation identification information. In FIG. 4, the third apparatus D3 has the activation identification information including the same arrangement pattern "++−+−" as that of the synchronization frame SF. Only the third apparatus D3 is thus activated.

The present invention is not limited to the foregoing embodiment. For example, in the foregoing embodiment, the synchronization frame SF is described to be constituted by arranging the synchronization word A and/or the inverted synchronization word as many as five words with repetition. However, the number of synchronization words constituting the synchronization frame SF is not limited thereto. The synchronization frame SF may be constituted by arranging the synchronization word A and/or inverted synchronization word as many as n (n is an integer greater than or equal to two) words with repetition.

In the foregoing embodiment, the transmission apparatus 11 and the reception apparatus 12 are described to perform communication via the network NW. The communication via the network NW may be wired communication including a power supply line communication, or wireless communication. For example, in the case of wireless communication, the transmission apparatus 11 includes a modulation part, and the reception apparatus 12 includes a demodulation part. The transmission apparatus 11 and the reception apparatus 12 modulate and demodulate the communication frame CF by a modulation method such as quadrature phase shift keying (QPSK), and transmit and receive the communication frame, respectively.

The synchronization word A and the synchronization word B may include respective different word bit strings or the same word bit string. If the word bit strings are the same, unlike the foregoing embodiment, the reception apparatus 12 can perform the synchronization detection in the synchronization frame SF (first synchronization detection) and the synchronization detection in the data frames DF (second synchronization detection) by using one correlator (either one of the first correlator 33 and the second correlator 37).

In the foregoing embodiment, the synchronization frame SF is described to include a permutation of the synchronization word A and the inverted synchronization word with repetition. However, this is not restrictive. The synchronization frame SF may include a plurality of synchronization words and their inverted synchronization words (inverted words) in combination. For example, one synchronization word and its inverted word have 32 (the fifth power of 2) possible permutations of five words with repetition. Two synchronization words and their inverted words can be combined to produce 1024 (the fifth power of 4) possible permutations with repetition. A plurality of synchronization words and their inverted words can thus be combined to transmit a greater amount of information as the synchronization frame SF.

In the foregoing embodiment, the synchronization frame SF is described to include only a permutation of the synchronization word A and the inverted synchronization word with repetition. However, the synchronization frame SF may also include other information. For example, the control information may be inserted into the synchronization frame SF, not the data frames DF. In essence, the synchronization frame SF has only to include a permutation of the synchronization word A and the inverted synchronization word with repetition.

In the foregoing embodiment, the data frames DF are described to include the synchronization word B, the control information, and the payload. However, the data frames DF have only to include the synchronization word B, and the rest of the configuration is not limited to the foregoing configuration example.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims.

This application is based upon and claims the benefit of priority from the prior Japanese Patent Application No. 2015-185325 filed on Sep. 28, 2016, the entire contents of which are incorporated herein by reference.

What is claimed is:
1. A communication system comprising:
   a transmission apparatus configured to successively generate signals constituted by communication frames and supply said signals to a network; and
   a reception apparatus configured to receive said signals so as to acquire a communication frame as a reception frame, wherein each of said communication frames includes a synchronization frame part and a data frame sequence part, said data frame sequence part includes a series of data frames carrying information data in a divided manner, said synchronization frame part includes n synchronization words arranged as a permutation, and an arrangement pattern of said permutation represents identification information, wherein each synchronization word is either a first synchronization word or an inverted first synchronization word, and the n is an integer greater than or equal to two, and said reception apparatus performs first synchronization detection by detecting an arrangement pattern of said permutation included in the synchronization frame part of the reception frame, and reproduces the information data included in the data frames of the reception frame according to the first synchronization detection to obtain reception data.

2. The communication system according to claim 1, wherein:

the transmission apparatus generates the data frame sequence by inserting a second synchronization word at every predetermined data length of the information data;

the reception apparatus further performs second synchronization detection by detecting the second synchronization word included in the data frames in synchronization detection intervals that are shorter than a frame length of the data frames, and top portions of the data frames in the reception frame are detected in the synchronization detection intervals; and reproduces the information data included in the data frames of the reception frame according to the first synchronization detection and the second synchronization detection to obtain the reception data.

3. The communication system according to claim 1, wherein:

a plurality of the reception apparatuses having respective different pieces of activation identification information are connected to the network;

the activation identification information is constituted by the n synchronization words each being either the first synchronization word or the inverted synchronization word;

the transmission apparatus transmits the synchronization frame part as an activation signal to the plurality of the reception apparatuses; and at least one reception apparatus of the plurality of the reception apparatuses is activated in response to an arrangement pattern of at least one of the first synchronization word or the inverted first synchronization word included in the activation signal received coinciding with an arrangement pattern of the activation identification information.

4. A transmission apparatus configured to:

generate signals constituted by communication frames and supply said signals to a network; wherein each of said communication frames includes a synchronization frame part and a data frame sequence part, said data frame sequence part includes a series of data frames carrying information data in a divided manner, said synchronization frame constituted by n synchronization words arranged as a permutation, an arrangement pattern of said permutation represents identification information, wherein each synchronization word is either a first synchronization word or an inverted first synchronization word, and the n is an integer greater than or equal to two; and generate a communication frame by adding the synchronization frame part to a top portion of the data frame sequence; and transmit the communication frame via the network.

5. The transmission apparatus according to claim 4, being further configured to generate the data frame sequence part by inserting a second synchronization word at every predetermined data length of the information data.

6. A reception apparatus configured to:

receive a communication frame included in signals via a network as a reception frame;

perform first synchronization detection by detecting an arrangement pattern constituted by n synchronization words arranged as a permutation from a synchronization frame of the reception frame part, wherein an arrangement pattern of said permutation represents identification information, and each synchronization word is either a first synchronization word or an inverted first synchronization word, and the n is an integer greater than or equal to two; and reproduce data included in a data frame of the reception frame according to the first synchronization detection to obtain reception data.

7. The reception apparatus according to claim 6, being further configured to perform second synchronization detection by detecting a second synchronization word included in the data frame in a synchronization detection interval that is shorter than a frame length of the data frame, wherein top portions of data frames in the reception frame are detected in the synchronization detection intervals, and reproduce the data included in the data frame of the reception frame according to the first synchronization detection and the second synchronization detection to obtain the reception data.

8. A communication method for transmitting and receiving a communication frame between a transmission apparatus and a reception apparatus via a network, the communication method comprising:

a data frame sequence generation step of causing the transmission apparatus to generate a data frame sequence part including a series of data frames carrying information data in a divided manner;

a synchronization frame generation step of causing the transmission apparatus to generate a synchronization frame part constituted by n synchronization words arranged as a permutation, an arrangement pattern of said permutation representing identification information, wherein each synchronization word is either a first synchronization word or an inverted first synchronization word, and the n is an integer greater than or equal to two;

a communication frame generation step of causing the transmission apparatus to generate a communication frame by adding the synchronization frame part to a top portion of the data frame sequence part;

a transmission step of causing the transmission apparatus to transmit the communication frame via the network;

a reception step of causing the reception apparatus to receive the communication frame via the network as a reception frame;

a first synchronization detection step of causing the reception apparatus to perform first synchronization detection by detecting an arrangement pattern of the first synchronization word or the inverted synchronization word included in the synchronization frame part of the reception frame; and a data reproduction step of causing the reception apparatus to reproduce the information data included in the data frames of the reception frame according to the first synchronization detection to obtain reception data.

9. The communication method according to claim 8, wherein:

the data frame sequence generation step includes a synchronization word insertion step of inserting a second synchronization word at every predetermined data length of the information data while generating the data frame sequence part;

the first synchronization detection step includes a second synchronization detection step of performing second synchronization detection by detecting the second synchronization word included in the data frames in synchronization detection intervals that are shorter than a frame length of the data frames, and top portions of the data frames in the reception frame are detected in the synchronization detection intervals; and the data reproduction step includes a step of reproducing the information data included in the data frames of the reception frame according to the first synchronization detection and the second synchronization detection to obtain the reception data.

* * * * *